United States Patent
Mertens et al.

(10) Patent No.: US 10,960,762 B2
(45) Date of Patent: Mar. 30, 2021

(54) VEHICLE HAVING AN OPERATOR CONTROL AND DISPLAY DEVICE AND METHOD FOR OPERATING SUCH A VEHICLE

(71) Applicant: AUDI AG, Ingolstadt (DE)

(72) Inventors: Joris Mertens, Ingolstadt (DE); Georg Haslinger, Ingolstadt (DE); Edwin Ollefers, Ingolstadt (DE); Markus Klug, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 351 days.

(21) Appl. No.: 15/780,193

(22) PCT Filed: Jun. 29, 2017

(86) PCT No.: PCT/EP2017/066165
§ 371 (c)(1),
(2) Date: May 30, 2018

(87) PCT Pub. No.: WO2018/010969
PCT Pub. Date: Jan. 18, 2018

(65) Prior Publication Data
US 2018/0354367 A1     Dec. 13, 2018

(30) Foreign Application Priority Data
Jul. 13, 2016   (DE) ..................... 10 2016 212 813.2

(51) Int. Cl.
*B60K 37/06*   (2006.01)
*B60K 35/00*   (2006.01)
(Continued)

(52) U.S. Cl.
CPC ............. *B60K 37/06* (2013.01); *B60K 35/00* (2013.01); *G06T 7/70* (2017.01); *G09G 5/38* (2013.01);
(Continued)

(58) Field of Classification Search
None
See application file for complete search history.

(56) References Cited

U.S. PATENT DOCUMENTS 8,587,546 B1   11/2013   Ei-Khoury
2010/0095233 A1*   4/2010   Skourup .............. G05B 19/409
715/771

(Continued)

FOREIGN PATENT DOCUMENTS

CN      101874234      10/2010
DE      102005048840 A1   4/2007
(Continued)

OTHER PUBLICATIONS

German Office Action for Application No. 102016212813.2 dated Apr. 27, 2017.
(Continued)

*Primary Examiner* — Sepehr Azari
(74) *Attorney, Agent, or Firm* — Staas & Halsey LLP

(57) ABSTRACT

The invention relates to a vehicle having a detection device for detecting a property of a vehicle occupant and an operator control and display device which is coupled to the detection device, has a display region and is configured to display information in the display region and by means of which a symbol can be displayed in the display region as a function of the sensed property. It is provided here that the property which is detected by means of the detection device is a position of the vehicle occupant, and the operator control and display device is configured to display the symbol in a partial region of the display region which is determined as a function of the detected position, and to assign the symbol to the vehicle occupant in such a way that when there is a change in position of the vehicle occupant that the symbol follows the vehicle occupant. The invention also relates to a
(Continued)

method for operating such a vehicle. The invention makes particularly flexible use of the vehicle possible.

15 Claims, 2 Drawing Sheets

(51) Int. Cl.
*G06T 7/70* (2017.01)
*G09G 5/38* (2006.01)

(52) U.S. Cl.
CPC ..... *B60K 2370/11* (2019.05); *B60K 2370/141* (2019.05); *B60K 2370/143* (2019.05); *B60K 2370/146* (2019.05); *B60K 2370/148* (2019.05); *B60K 2370/1438* (2019.05); *B60K 2370/151* (2019.05); *B60K 2370/1523* (2019.05); *B60K 2370/164* (2019.05); *B60K 2370/175* (2019.05); *B60K 2370/182* (2019.05); *B60K 2370/184* (2019.05); *B60K 2370/21* (2019.05); *B60K 2370/332* (2019.05); *B60K 2370/334* (2019.05); *B60K 2370/338* (2019.05); *B60K 2370/52* (2019.05); *B60K 2370/569* (2019.05); *B60K 2370/573* (2019.05); *B60K 2370/58* (2019.05); *B60K 2370/589* (2019.05); *B60K 2370/688* (2019.05); *B60K 2370/73* (2019.05); *B60K 2370/736* (2019.05); *B60K 2370/739* (2019.05); *B60K 2370/741* (2019.05); *B60K 2370/744* (2019.05); *B60K 2370/794* (2019.05); *G06T 2207/30196* (2013.01); *G06T 2207/30268* (2013.01); *G09G 2354/00* (2013.01)

(56) References Cited

U.S. PATENT DOCUMENTS

| | | | | |
|---|---|---|---|---|
| 2010/0269072 | A1* | 10/2010 | Sakata | G06F 1/1601 715/863 |
| 2017/0098364 | A1* | 4/2017 | Jaegal | B60Q 9/00 |

FOREIGN PATENT DOCUMENTS

| | | |
|---|---|---|
| DE | 102007005027 A1 | 1/2008 |
| DE | 102006050016 A1 | 4/2008 |
| DE | 102010056411 A1 | 6/2012 |
| DE | 102012222522 A1 | 6/2013 |
| DE | 102012019506 A1 | 4/2014 |
| DE | 102016212813.2 | 7/2016 |

OTHER PUBLICATIONS

International Search Report for PCT/EP2017/066165 dated Oct. 10, 2017.
PCT/EP2017/066165, Jun. 29, 2017, Joris Mertens et al., AUDI AG.
English Translation by WIPO dated Jan. 24, 2019 of the International Preliminary Report on Patentability in corresponding International Patent Application No. PCT/EP2017/066165.
Office Action dated Mar. 25, 2019 in corresponding Chinese Patent Application No. 201780003632.5 (6 pages).
"Android Touch Screen Not Working Problem [Fix]", Techkhoji.com, Feb. 27, 2014, printed from www.techkhoji.com/android-touch-screen-not-working-problem-fix/ on Jun. 26, 2019.
Office Action dated Jul. 1, 2019 in corresponding European Patent Application No. 17734082.5.

* cited by examiner

VEHICLE HAVING AN OPERATOR CONTROL AND DISPLAY DEVICE AND METHOD FOR OPERATING SUCH A VEHICLE

CROSS REFERENCE TO RELATED APPLICATIONS

This application is the U.S. national stage of International Application No. PCT/EP2017/066165, filed Jun. 29, 2017 and claims the benefit thereof. The International Application claims the benefit of German Application No. 10 2016 212 813.2 filed on Jul. 13, 2016, both applications are incorporated by reference herein in their entirety.

BACKGROUND

DE 10 2012 019 506 A1 has already disclosed a vehicle having a display instrument, in which a windowpane of the vehicle is used as a display area. Here, at least a portion of the windowpane can be switched between two states with different light transmission behavior. In particular, the two states can differ in terms of their light absorption and/or in terms of their reflectivity. By way of example, a viewing direction of the driver can be captured with the aid of the camera that is directed onto the driver of the vehicle, the state of the portion being set on the basis of the viewing direction. Moreover, the state of the portion can be set on the basis of a predicted movement direction of the vehicle. By way of suitably setting the state of the portion, it is possible, in the process, to control the perception of the information displayed by the display instrument such that, depending on requirements, the traffic space lying beyond the display area or the information of the display instrument can be made to be better perceivable for the driver of the vehicle, in particular.

DE 10 2006 050 016 A1 discloses a display apparatus for a motor vehicle, having a sensor arrangement for determining a viewing direction of a driver of the motor vehicle and having a second display apparatus that is spatially separated from the first. Provided by a display controller, information relating to the motor vehicle can be displayed on the first or the second display apparatus in this case, depending on the viewing direction of the driver. In particular, the information can be displayed on a pane that delimits the passenger compartment of the motor vehicle, for the purposes of which the display apparatus can be configured as a head-up display. Thus, overall, the information relating to the motor vehicle can be displayed, in each case, on a display currently looked at by the driver.

DE 10 2012 222 522 A1 describes a projected entertainment system for rear compartment occupants of a vehicle. Here, provision is made of an apparatus for extending graphics displayed on an area in the vehicle using a rear seat entertainment projection system management device. From a graphics extending module, an input is obtained which brings about a reaction to the displayed graphics and extends the graphics on the basis of the reaction. Using a graphics projection system, the produced graphics and the extended graphics are displayed on the area in the vehicle, such as a side pane and/or a door area and/or a column and/or a seat rest and/or a roofliner and/or a sunroof and/or a floor and/or a substantially transparent display and/or an emission of the display. The system management device can be configured to control displays in a plurality of areas in the vehicle. Here, the same graphics content can be displayed in all areas or different content can be selected for different displays, for example on the basis of the age or specific interests of the passenger viewing the specific display.

SUMMARY

It is an object of the present invention to provide a vehicle having an operator control and display apparatus and a method for operating such a vehicle, which facilitate a particularly flexible use of the vehicle.

This object is achieved by a vehicle having the features of patent claim 1 and a method having the features of patent claim 10. Advantageous configurations and developments of the invention are specified in the dependent patent claims.

The vehicle according to the invention, which may be a motor vehicle, an automobile or any other vehicle predominantly serving to transport people, has a recognition device for recognizing at least one property of at least one vehicle occupant and an operator control and display apparatus coupled to the recognition device. The latter in turn has a display region and it is configured to display information in this display region. Moreover, at least one symbol is presentable in the display region by the operator control and display apparatus, depending on the captured property. Here, in particular, the display region may be formed in a contiguous manner or from a plurality of—even disjoint—portions. Here, the display region or one or more of its portions—for example also dependent on a specific configuration of the display apparatus—can be virtually any area or area region in principle, in particular areas or area regions arranged in or on a passenger cell of the vehicle. A plurality of portions of the display region may thus also be formed differently, for example from different materials, or may belong to different parts of furnishing or component parts of the vehicle.

In order to facilitate particularly flexible use of the vehicle, provision is made for the property recognized by the recognition device to be a position of the vehicle occupant and the operator control and display apparatus to be configured to present the symbol in a portion of the display region that is determined depending on the recognized position. Here, the symbol is assigned to the vehicle occupant in such a way that it follows the latter if the vehicle occupant changes their position. To this end, the recognition device may include a camera or a plurality of cameras, for example, which, in particular, can be arranged in the passenger cell of the vehicle. Provision can be made for the portion of the display region, in which the symbol is presented, to be different, in particular spatially and/or functionally separated, from another portion of the display region, in which the information is presented.

A recognition region of the recognition device, i.e. that region in which the position of the vehicle occupant is recognizable or determinable or ascertainable, can be matched to an interior of the vehicle or the passenger cell, in particular the size and form thereof, in such a way that the vehicle occupant does not completely leave the capture range in the case of any desired position changes, at least in the case of any desired position changes in accordance with regulations within the passenger cell. This advantageously facilitates a particularly reliable, in particular also continuous position capture or position determination and/or position tracking (tracking) of the vehicle occupant, as a result of which a particularly reliable assignment of the symbol to the vehicle occupant is facilitated. Position changes in accordance with regulations may in this case be predetermined, set or restricted by use or behavior guidelines from the vehicle producer and/or the legislature, for example, or, for instance, they can be such position changes that do not put the safety of a vehicle occupant at risk. Provision can also be made for the capture region of the capture device to at least partly include surroundings or the vicinity of the vehicle. As a result, the symbol may advantageously already be presented when a person approaches the vehicle such that the operator control and display apparatus, under certain circumstances, may also already be usable from outside of the vehicle. Within this sense, the phrase vehicle occupant should not be interpreted too strictly either, and it may also include persons situated outside of the vehicle, in particular users of the operator control and display apparatus, in particular for as long as these are situated within the capture region of the recognition device. By way of example, the position of the vehicle occupant can be captured continuously or regularly at predetermined intervals which may be shorter than a period of time that is typically required by the vehicle occupant, for example for changing a seat within the vehicle.

The symbol following the vehicle occupant if the vehicle occupant changes their position means, in particular, that the symbol is presented in a different portion of the display region after and/or during the position change than before the position change, wherein, furthermore, the respective portion is determined depending on the position and/or the position change of the vehicle occupant. Here, provision can be made for the symbol to be faded out with the start of the position change and to be faded-in in the corresponding other portion after the completion of the position change. Here, it is possible to provide a threshold or limit for an extent or scope of a movement of the vehicle occupant, with the presentation of the symbol or the portion of the display region in which the symbol is presented only being adapted once the limit has been exceeded. As a result, it is advantageously possible to avoid an unsettled presentation of the symbol or an unnecessary change in a presentation position of the symbol should the vehicle occupant only undertake a minor movement or position change. Furthermore, it is also conceivable for the symbol to remain permanently visible, even during the position change of the vehicle occupant, and, in the process, to be presented continuously in changing portions of the display region. Thus, expressed differently, it is possible to present a type of animation or a movement of the symbol along the display region. Likewise, it is also conceivable for the symbol only to be presented when the vehicle occupant is situated within a predetermined distance from at least one portion of the display region. By way of example, this distance can be designed in such a way that the symbol is reachable by the vehicle occupant for an operator control action, in particular reachable with a finger, when the vehicle occupant is situated or positioned no further than the predetermined distance from the display region or the portion of the display region.

By way of example, the symbol can be realized as a restricted region that is contrasted from the surroundings— for instance, by a greater brightness, a different color, a pulsation or the like—, as a sign, as any graphics, as a word or the like. The symbol may also be part of an interface, i.e. a user interface, and/or it may serve to call or display an interface or any other information or presentations on the display region. Here, provision is made, in particular, for the interface that is called or presented in such a way and/or for the information that is called or presented in such a way to be presented in a further portion of the display region, which is linked or correlated to the presentation position of the symbol and hence, at least indirectly, also to the recognized position of the vehicle occupant. Thus, there is an assignment both between the recognized position of the vehicle occupant and the portion in which the symbol is presented and also between this portion, i.e. the presentation position of the symbol, and a presentation position of the information, graphics or the like that are called, presented or displayed by a direct or indirect interaction with the symbol.

The invention offers the advantage that the use of a functionality that is assigned to the symbol, of an interface, of which the symbol is a part, and/or of information, interfaces or the like that are made accessible by interactions with the symbol is possible in a flexible and dynamic manner at different positions within the vehicle and/or on the vehicle. Using this, it is possible to circumvent the disadvantage of previously known stationary interfaces, which allow the operator control in an economically ideal manner in or at only a single position or from a specific position. Hence, the vehicle occupant can thus freely select their position within the vehicle, without being restricted in terms of their operator control, display and/or interaction options.

Depending on the configuration of the interaction options with the symbol and/or of the functionalities assigned to the symbol, it is also possible to facilitate the use or control of mobile terminals or functionalities that are usable or controllable by mobile terminals, for example, at different positions without the mobile terminal having to be held or affixed at the corresponding position. Consequently, it is possible overall to also improve safety, in particular when operating the vehicle, since reaching or accessing the symbol and the functionalities, information and/or interfaces linked therewith is possible at all times in a particularly simple manner and without safety-impairing movements or body positions. Since the use of unsecured, i.e. non-affixed mobile terminals, i.e., for example, mobile terminals only held in a hand, is therefore no longer necessary, it is possible to prevent these from moving uncontrolled in a dangerous manner within the vehicle in the case of an accident or impact situation. Further, a multiplicity of functionalities and information items can be made accessible or provided to the vehicle occupant, in particular all vehicle occupants, by way of the invention, the functionalities and information items previously often only being accessible or available to a respective driver or front seat passenger of the vehicle, for example. Particularly advantageously, the vehicle may be a piloted vehicle, i.e. a vehicle configured for highly automated and/or autonomous driving.

In a further configuration of the invention, provision is made for the vehicle to have a windowpane arrangement which, at least in regions, is embodied at least as a part of the display region. Expressed differently, the windowpane arrangement or part of the windowpane arrangement can be configured to present information. However, the display region here need not be restricted to the windowpane arrangement, but may additionally also include other areas or area regions. Thus, the display region of the operator control and display apparatus may, at least in part or in portions, also extend outside of, or next to, the windowpane arrangement. This applies, in particular, to that portion or those portions which are provided for presenting the symbol. A lighting and/or display device, in particular with a band-like extent, can be arranged, for example, at or in an interior component of the vehicle, arranged below a respective windowpane of the windowpane arrangement or a window opening in the vertical vehicle direction, as a portion of the display region and as a part of the operator control and display apparatus. By way of example, such a display device can have a multiplicity of light sources—for example light-emitting diodes—arranged next to one another and/or regions that are controllable in terms of their light transmission such that a restricted portion can be presentable or usable as a symbol that is contrasted in relation to the remaining device by way of a targeted actuation. By way of example, the remaining band-like illumination and/or display device can permanently shine with brightness that is reduced in relation to the symbol or it can be permanently illuminated—at least during the operation of the vehicle.

By way of example, the windowpane arrangement can restrict the passenger cell of the vehicle, at least in regions, and/or delimit a plurality of spatial regions within the vehicle and/or the passenger cell from one another, either entirely or in part. In particular, the windowpane arrangement may include respective side panes, i.e. lateral windowpanes, and respective—also divided—front and rear windshields of the vehicle.

By way of example, as a result thereof, the windowpane arrangement can be configured to display information, at least in regions, by virtue of respective windowpanes being equipped with a transparent screen or being embodied as a transparent screen.

According to one configuration of the invention, the display region is embodied, at least in regions, as an active screen and/or as an operator control element that is operable by touch (touchscreen or touchpad). Here, an active screen or an active display is distinguished by virtue of the physical process producing a pixel also leading to an emission of light. Thus, consequently no separate background illumination is required for presenting images, graphics or the like, as a result of which, advantageously, the use of the windowpane arrangement, for example, as a screen is reliably possible, independently of external conditions or the surroundings of the vehicle. The configuration of the display region, in particular of the windowpane arrangement, as a touchscreen advantageously facilitates a particularly simple and intuitive operability and may contribute to reducing a production outlay for the vehicle, for example, by way of a saving of additional operator control elements facilitated thereby. Specifically, an active matrix display on the basis of TFT (thin-film transistor) screen technology, in particular using organic light-emitting diodes (AMOLED, "active-matrix organic light-emitting diodes"), may, for example, be provided on the area serving as a display region—the windowpane or the windowpane arrangement, for example—or integrated therein. In contrast to the use of a projector or head-up display technology, the presentation thus cannot be impaired by a beam path being covered.

However, an alternative or additional use of different display technology is also conceivable. By way of example, provision can be made of a projector or projection device. As a result, multifaceted areas can be used as a display region in an advantageous manner and with little outlay. In principle, areas which are not part of the vehicle may also be used as display region in the process.

In a further configuration of the invention, provision is made for the symbol to be embodied as an operator control element, the operation of which can prompt the presentation of the information in the display region by the operator control and display apparatus. To this end, a portion of the display region employed or provided for presenting the symbol, or a corresponding component of the symbol, may have, for example, a pressure, touch and/or approach responsive and/or sensitive embodiment. Here too, this facilitates a particularly simple and intuitive operation or operability without additional complicated operator control elements. In principle, provision could however alternatively or additionally also be made of any further operating types or operating options, for example a gesture and/or speech control.

In a further configuration of the invention, provision is made for the information presented in the display region following the operation of the symbol to be personalized for the vehicle occupant who has performed the operation. Expressed differently, for example, a type or selection of the information, just like the symbol itself, may be assigned to the vehicle occupant such that, in the case of a position change of the vehicle occupant and renewed operation of the symbol, for example, it is not necessary to display or present provided standard information, graphics or the like. Instead, a presentation that was previously adapted for the respective vehicle occupant and/or set according to their requirements can be maintained over the position change and can continue to be displayed or be displayed anew to the same vehicle occupant after their position change. It is also possible to provide the storage of such settings and further preferences, and the recall thereof from a corresponding storage device, when the symbol is operated. Such a storage device may be part of the operator control and display apparatus, i.e. part of the vehicle, or else it may be independent of the vehicle, with combinations also being conceivable. In a similar way, a presentation or configuration of the symbol may also be assigned to the respective vehicle occupant and may be personalized accordingly. In particular, this can increase an operator convenience and, for example, accelerate access to certain information. By way of example, the personalization of the information can also include or take account of the last, or particularly frequently, recalled or presented information items and/or undertaken settings and/or further properties of the vehicle occupant recognized or captured by the recognition device. By way of example, it may be possible to recognize the age and accordingly adapt the presentation of the information and/or adapt an availability of certain information or content.

In a further configuration of the invention, provision is made for the display region for presenting the symbol to be arranged at a frame part of the vehicle at least partly encompassing a windowpane arrangement. As a result of this, it is advantageously possible to prevent a restriction or impairment of a visual region of the windowpane arrangement or of a viewing field of the vehicle occupant, for example onto surroundings of the vehicle. Furthermore, this reliably allows the presentation of the symbol in a consistent and unchanging manner, even independently of an adjustment of the windowpane arrangement, in particular in the case of a completely retracted or lowered windowpane, for example. This is particularly relevant and advantageous if the windowpane arrangement is used, intended to be used or provided as part of the display region for presenting information.

In a further configuration of the invention, provision is made for the recognition device to be configured to simultaneously recognize the respective position of a plurality of vehicle occupants and, moreover, for the operator control and display apparatus to be able to be used to present, simultaneously, at least one symbol in each case, i.e. for each vehicle occupant, in a respective portion of the display region that is determined depending on the recognized position. Thus, expressed differently, a number of vehicle occupants situated in the vehicle at the same time can also use the operator control and display apparatus independently of one another by a respective dedicated symbol assigned to the vehicle occupant.

In a further configuration of the invention, provision is made for the operator control and display apparatus to be configured to respectively assign at least one of the simultaneously presented symbols to each of the vehicle occupants in such a way that the respective symbol follows the respective vehicle occupant when they change their position. The recognition device may be configured to maintain the assignment of the symbols to the respective vehicle occupants even in the case of a simultaneous movement or position change of a plurality of vehicle occupants.

In a further configuration of the invention, provision is made for the vehicle occupant, in particular a plurality of vehicle occupants, to be identifiable by the recognition device. As a result of such an identification, in particular such a unique identification, of the vehicle occupant or all vehicle occupants, an even better personalization and adaptation of the presentation of the symbol and/or of the presented information or information to be presented can advantageously be facilitated. Here, by way of an appropriate storage of respective identities and assigned settings, for example in the form of a respective user profile, it is possible to maintain the respective assignments, particularly advantageously even throughout interruptions in the operation of the operator control and display apparatus and/or of the vehicle. In particular, but not exclusively, an identification or recognition of the vehicle occupant or the vehicle occupants may be additionally or alternatively undertaken or assisted in this context on the basis of a respective mobile electronic device, in particular a terminal, such as a cellular telephone (smartphone) or the like. Here, it is conceivable to transmit or interchange information or data stored on the electronic device in a unidirectional or bidirectional manner between the device and the operator control and display apparatus for the purposes of personalizing and/or selecting the presented information or information to be presented. Likewise, access to a data source present outside of the vehicle, by way of example by way of a wireless data connection, may be conceivable.

A method according to the invention serves to operate a vehicle having a recognition device for recognizing a property of at least one vehicle occupant and an operator control and display apparatus that is coupled to the recognition device and that has a display region. Here, information is presentable in the display region by the operator control and display apparatus. A respective position of the at least one vehicle occupant is continuously recognized by the recognition device as a property of the at least one vehicle occupant and a respective symbol assigned to the vehicle occupant is presented by the operator control and display apparatus in a portion of the display region of the operator control and display apparatus determined depending on the respective identified position of the respective vehicle occupant. Here, the symbol is assigned to the vehicle occupant in such a way that it follows the latter if the vehicle occupant changes their position. Here, a continuous recognition of the position of a vehicle occupant can mean both continuous position recognition and/or tracking and also, for example, a position recognition undertaken at regular time intervals. It is likewise conceivable for the capture region of the recognition device to be monitored continuously by a movement sensor and for a position recognition only to be carried out once the movement sensor registers a movement, in particular a movement which goes beyond a predetermined limit value or threshold in terms of its magnitude or extent.

In a further configuration of the method according to the invention, provision is made for the symbol to be embodied as an operator control element and the information to be presented in the display region following an operation of the symbol by the vehicle occupant.

Independently of other configurations, provision is may be made for a symbol to be automatically assigned and presented to a person as soon as the person approaches the vehicle or enters the vehicle. Accordingly, the symbol is automatically masked as soon as the person leaves the vehicle or moves away from the vehicle.

In order to be able to realize and control the described and further functions of the operator control and display apparatus and of the recognition device, provision is additionally made of a control device or controller as part of the respective apparatus/device and/or of the vehicle.

The functional embodiments of the vehicle according to the invention described previously and below, and also in the patent claims, and also the corresponding advantages are also accordingly transferable in an analogous fashion to the method according to the invention and/or the devices and components used to carry out the method according to the invention, and vice versa.

BRIEF DESCRIPTION OF THE DRAWINGS

These and other aspects and advantages, features and details will become more apparent and more readily appreciated from the following description of an exemplary embodiment, taken in conjunction with the accompanying drawings of which.

DETAILED DESCRIPTION OF THE PREFERRED EMBODIMENT

Figure 1:
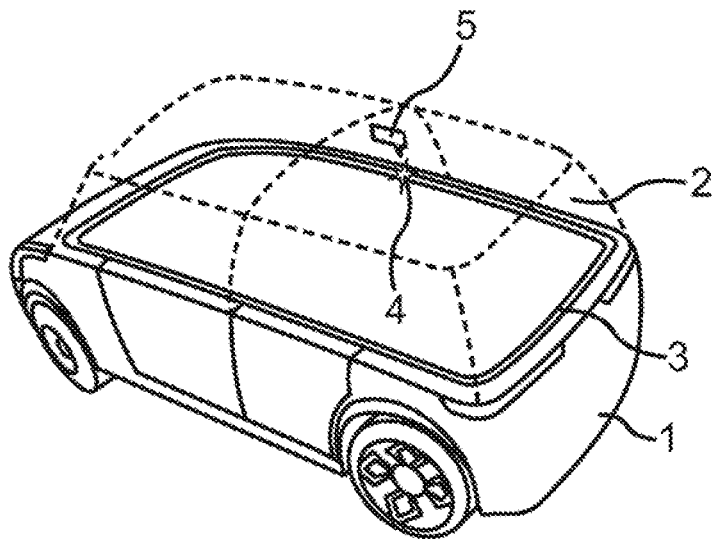
FIG. 1 is a schematic and much simplified perspective illustration of a vehicle with a circumferential windowpane arrangement and a circumferential operator control and display apparatus.

Reference will now be made in detail to the preferred embodiments, examples of which are illustrated in the accompanying drawings, wherein like reference numerals refer to like elements throughout.

In a schematic perspective view, FIG. 1 shows a vehicle 1 having a windowpane arrangement 2 that is circumferential in the vehicle transverse direction and in the vehicle longitudinal direction, the windowpane arrangement being configured, at least in regions, to display information. To this end, provision is made of a transparent screen, which may be based on organic light-emitting diodes, on the windowpane arrangement 2 or integrated in the latter. In the present case, the screen is moreover provided for operation by means of touch; thus, this is a touchscreen. A likewise circumferential light band 3 is arranged on the inner side of the windowpane arrangement 2 as a part of an operator control and display apparatus of the vehicle 1. By way of example, the light band 3 can include a multiplicity of light-emitting diodes or the like that are arranged next to one another along the circumferential extent and the light band may be connected to a controller (not depicted here) and to an electronic vehicle electrical system (not depicted here either) of the vehicle 1. In the present case, a surface of the light band 3 that faces an interior of the vehicle 1 and therefore faces a respective vehicle occupant is likewise operable by touch. Thus, both the light band 3 and at least a part of the windowpane arrangement 2 are parts of a display region in this case.

The vehicle 1 may be a piloted vehicle which, in relation to conventional vehicles, accordingly has greater flexibility or design freedom in respect of an interior, an arrangement of seating opportunities and hence also of respective positions or intended whereabouts of respective vehicle occupants. Accordingly, a particularly flexible option for operating or using the operator control and display apparatus, or generally for interacting therewith, is also particularly advantageous here.

Although not illustrated here, the vehicle 1 further has a recognition device which, in the present case, includes a camera or camera arrangement of a plurality of cameras. It is possible to identify a person who approaches the vehicle 1, enters the vehicle 1 and/or remains and/or moves in the vehicle 1 by means of the recognition device. For reasons of simplicity, these are subsumed as vehicle occupants below. By way of example, identification can be effectuated by an evaluation and/or comparison of recorded image data with a database or corresponding data or information stored in a storage device. However, an only temporary identification is also conceivable in which, for example, an individual distinguishability of the vehicle occupants situated in the vehicle during the operating cycle is intended and ensured during only one operating cycle of the vehicle 1.

Moreover, a respective position of the identified vehicle occupant or occupants can also be identified by means of the recognition device. If a vehicle occupant is recognized, in particular within the vehicle 1, this is indicated by a symbol 4. Here, in the present case, the symbol 4 is a restricted portion of the light band 3 which shines more brightly in relation to the remaining light band 3. Here, an exact presentation or display position of the symbol 4 is determined depending on the recognized position of the identified vehicle occupant. Here, the symbol 4 may be displayed in a portion of the light band 3 that is as close as possible to the identified vehicle occupant or the identified position thereof and that is reachable as easily as possible and to the best possible extent by the vehicle occupant in terms of ergonomics. As soon as the vehicle occupant moves within the vehicle and thus undertakes a position change, the symbol 4 is faded out at the previous position assumed before the position change and faded in at another position or in another portion of the light band 3 which is determined as described, depending on the new position of the vehicle occupant. Consequently, the symbol 4 thus follows the vehicle occupant to whom it was assigned upon identification of the latter.

In a corresponding way, it is also possible to recognize a plurality of vehicle occupants, which are each then assigned, and have displayed to them, a dedicated symbol 4. Here, each of the symbols 4 is then independent of the other symbols 4.

Provision can be made for the light band 3 to be touch responsive or touch sensitive, i.e. embodied to be operable by means of touch, but, in the process, only a touch of the symbol 4, i.e. of the portion of the light band 3 respectively corresponding to the symbol 4, being assigned a functionality. Expressed differently, it is not the case that the entire light band 3 is permanently embodied as an operator control element and touching the light band 3 in a portion not currently used as a symbol 4 remains without consequences. Hence, it is advantageously possible to avoid an inadvertent or ambiguous operation.

If the symbol 4 is touched in the present case, an interface 5 is presented, displayed or faded in by means of the screen provided at or in the windowpane arrangement 2. The interface 5 can be an interface for operating further functionalities, for example, of the vehicle, any graphics or a presentation of information or the like.

Figure 2:
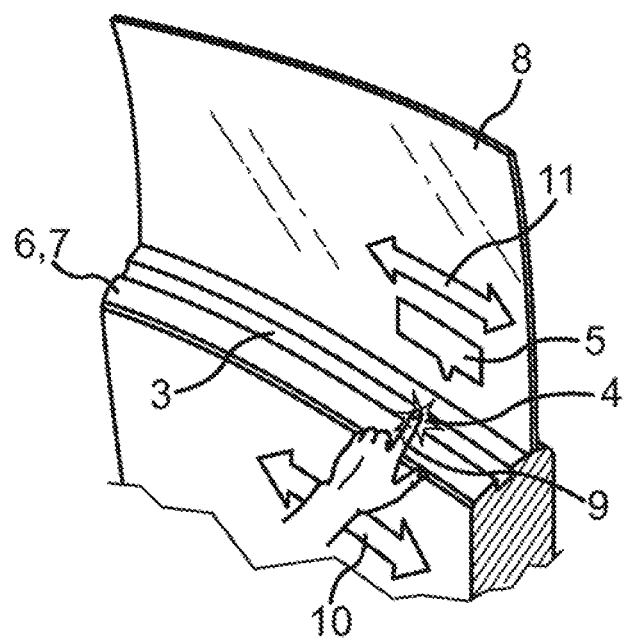
FIG. 2 is a schematic and sectional perspective illustration of a side wall of a vehicle having a windowpane and a partly illustrated operator control and display apparatus.

FIG. 2 shows a schematic and sectional perspective view of a side wall 6 of a vehicle, for example of the vehicle 1 from FIG. 1. The side wall 6 may also be part of a door of the vehicle 1. On a side facing the vehicle interior, the side wall 6 or an interior component arranged thereon, for example an interior trim, of the vehicle 1 has a surface 7 which, in the present case, may be arranged e.g. at least virtually parallel to a floor of the vehicle 1 and e.g. at least virtually perpendicular to a windowpane 8. The light band 3 is integrated in this surface 7 in the present case. Here, the windowpane 8 can be a portion of the windowpane arrangement 2 and, in the present case, it is arranged to the outside of the light band 3 integrated into the surface 7.

Specifically, FIG. 2 shows an operating action for which a vehicle occupant touches the symbol 4, that is to say a shining highlighted portion of the light band 3, with one finger 9. Accordingly, the interface 5 is presented in the windowpane 8 by means of the screen or display region arranged there as a reaction to this touch or operating action. The presentation position of the interface 5 is not arbitrary or randomly selected in this case, instead it correlates with the presentation position of the symbol 4. By way of example, the interface 5 can be presented as close as possible to the symbol 4, or at a predetermined fixed distance therefrom or with a given spatial relationship to the symbol 4. The precise presentation position, presentation type, presentation size and the like for the interface 5 may vary and depend, for example, on the type of information presented by means of the interface 5 or on the functionalities or the like that are accessible by way of the interface 5.

By moving the finger 9 on the light band 3 and along the light band 3, it is likewise possible to move or displace the symbol 4 along the light band 3. The corresponding movement is indicated here by an arrow 10. Here, the interface 5 is also moved along the windowpane 8 in a corresponding manner, and so it continues to have the same spatial relation with respect to the symbol 4, indicated here by an arrow 11. In addition to displacing the symbol 4 and the interface 5, it is also possible to provide further operating actions or operating gestures which may be linked to corresponding individual functionalities or effects. By way of example, touching the symbol 4 for a predetermined time interval may trigger a different function or a different effect than a shorter tapping of the symbol 4.

By way of an appropriate operation or an appropriate operating action, it is thus possible to effectively displace the symbol 4, and hence also the interface 5, such that ideal individual positioning or setting of the interface 5 can be undertaken by the vehicle occupant in particular. The automatically set or predetermined exact position of the symbol 4 and/or of the interface 5 can therefore be finely adjusted or adapted by the vehicle occupant in accordance with their respective desires or requirements, for example in respect of an arm length and consequently a convenient reachability. Alternatively, or additionally, it is also conceivable for a touch of the light band 3 at a position other than that of the symbol 4 to lead to the symbol 4 being displayed at the location of the touch and, in the process, the position of the interface 5 also being adapted accordingly. In order to avoid a frequent inadvertent displacement of the symbol 4 and of the interface 5, particularly in the latter case, the light band 3 may also be set into the surface 3 in the downward direction in relation to the vertical vehicle direction or it may be arranged in a recessed or sunk manner in relation to the surface 7 as an alternative to an arrangement which is flush with respect to the surface 7. Consequently, the surface 7 can be used without problems as an armrest for example without inadvertent operator processes being triggered thereby or in the process.

Figure 3:
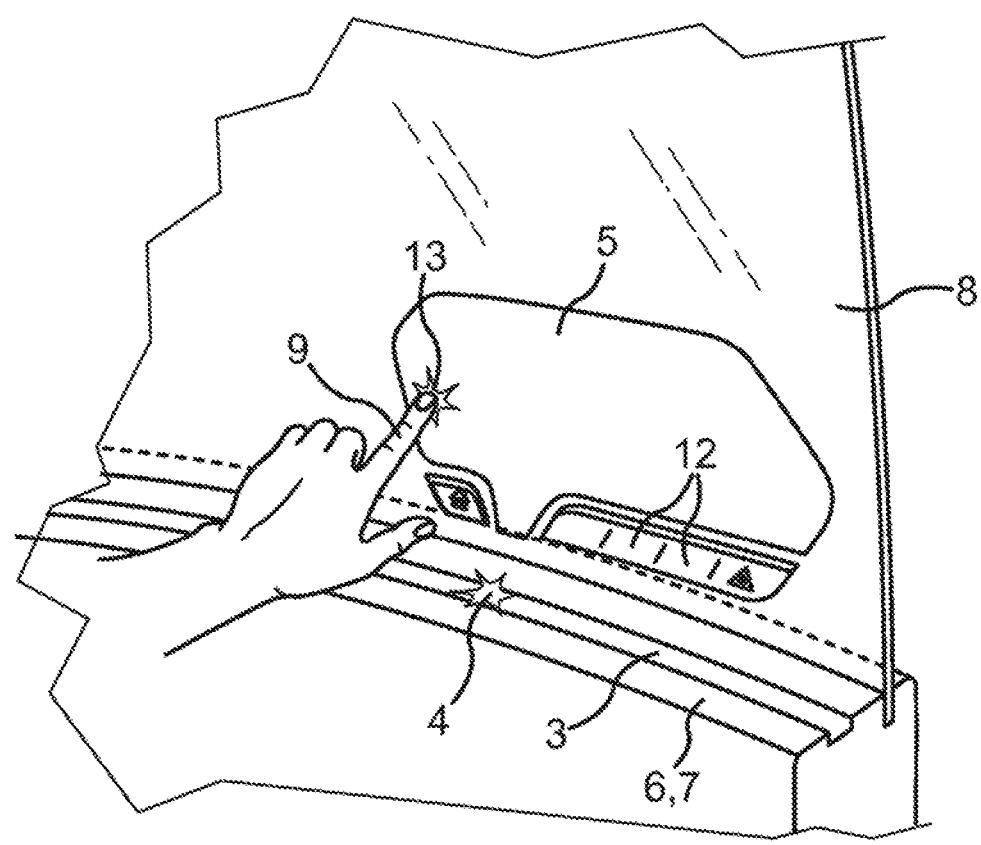
FIG. 3 is a schematic and perspective detailed view of an illustration corresponding to FIG. 2.

FIG. 3 shows a schematic sectional and perspective detailed view of the side wall 6 in a situation and/or embodiment that is different to the illustration from FIG. 2. Here too, the light band 3 is integrated into the surface 7 and the symbol 4 is active as a shining portion of the light band 3. The interface 5 likewise illustrated in the windowpane 8 in this case has a plurality of operator control elements 12, by means of which various menu levels, functionalities or the like are recallable, accessible or operable. In the situation illustrated in the present case, the vehicle occupant carries out an operating action by touching the interface 5 with a finger 9. Particularly advantageously, provision is made here for the touching of the interface 5 and/or a registration or successive execution of the operating action to be indicated or elucidated by a lighting effect 13 at a location of the touch.

By way of the interface 5, numerous different functionalities may be accessible and a wide range of different information items are recallable and presentable. By way of example, this may relate to functionalities of the motor vehicle which, in the case of conventional known vehicles, were previously presented in an instrument cluster in an instrument panel and/or on a screen or a display device of e.g. a navigation system or an entertainment and/or media playback system. However, going beyond this, a presentation of e.g. information recalled via a wireless data connection, in particular, is also conceivable.

Provision may be made for the interface 5 to be faded out again after a predetermined time interval without an operating action. As a result, it is advantageously possible to minimize the power consumption and avoid an unnecessary impairment of a visual region or visual field of the vehicle occupant or occupants. However, such an automatic fadeout of the interface 5 may be prevented, for example by way of an appropriate setting or e.g. in the case of a running media playback.

As an alternative to the illustrations shown here, the light band 3 and/or the symbol 4 may also be displayed or presented in the windowpane arrangement 2—for instance in a lower portion in the vertical vehicle direction—by means of the screen or display region provided there. In this case, it is possible to dispense with the imaged light band 3 as a physical component.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A vehicle, comprising:
a recognition device configured to detect a position of a vehicle occupant; and
an operator control and display apparatus, coupled to the recognition device, having a display region configured to present information items in the display region, including a symbol presentable in a portion of the display region determined depending on the position detected by the recognition device, the symbol representing the vehicle occupant, and to change the portion of the display region where the symbol is displayed to represent a change in the position of the vehicle occupant.

2. The vehicle as claimed in claim 1, further comprising a windowpane arrangement providing, at least in regions, at least part of the display region.

3. The vehicle as claimed in claim 1, wherein the display region, at least in regions, includes at least one of an active screen and an operator control element operable by touch.

4. The vehicle as claimed in claim 1,
wherein the symbol is an operator control element, and
wherein the operator control and display apparatus responds to operation of the symbol by presentation of the information items in the display region.

5. The vehicle as claimed in claim 4, wherein the information items presented in the display region following the operation of the symbol are personalized for the vehicle occupant performing the operation.

6. The vehicle as claimed in claim 1,
further comprising a windowpane arrangement with a frame part, and
wherein the display region for presenting the symbol is arranged at the frame part at least partly encompassing the windowpane arrangement of the vehicle.

7. The vehicle as claimed in claim 1,
wherein the recognition device is configured to simultaneously recognize respective positions of a plurality of vehicle occupants, and
wherein the operator control and display apparatus simultaneously presents a respective symbol in a respective portion of the display region determined depending on the position.

8. The vehicle as claimed in claim 7, wherein the operator control and display apparatus is configured to respectively assign at least one respective symbol to each respective vehicle occupant and to move the respective portion of the display region where the respective symbol is displayed to follow change in the position of the respective vehicle occupant.

9. The vehicle as claimed in claim 1, wherein a plurality of vehicle occupants, are identifiable by the recognition device.

10. A method for operating a vehicle having a recognition device for recognizing a position of at least one vehicle occupant and an operator control and display apparatus, coupled to the recognition device, with a display region in which information is presentable, comprising:
continuously recognizing a respective position of the at least one vehicle occupant by the recognition device as a property of the at least one vehicle occupant;
presenting a respective symbol representing the vehicle occupant by the operator control and display apparatus in a respective portion of the display region determined depending on the respective position of the at least one vehicle occupant; and
changing the respective portion of the display region where the respective symbol is displayed to represent a change in the respective position of the at least one vehicle occupant changes position.

11. The method as claimed in claim 10, wherein the respective symbol is an operator control element and the information is presented in the display region following an operation of the respective symbol by the at least one vehicle occupant.

12. The method as claimed in claim 10, wherein the information presented in the display region following the operation of the symbol is personalized for the at least one vehicle occupant performing the operation.

13. The method as claimed in claim 10,
wherein said recognizing simultaneously recognizes respective positions of a plurality of vehicle occupants, and
wherein said presenting simultaneously presents the respective symbol in the respective portion of the display region determined depending on the respective position.

14. The method as claimed in claim 13, further comprising:
respectively assigning at least one respective symbol to each respective vehicle occupant; and
moving the respective portion of the display region where the respective symbol is displayed to follow change in the position of the respective vehicle occupant.

15. The method as claimed in claim 10, further comprising identifying a plurality of vehicle occupants.

* * * * *

UNITED STATES PATENT AND TRADEMARK OFFICE
CERTIFICATE OF CORRECTION

PATENT NO. : 10,960,762 B2
APPLICATION NO. : 15/780193
DATED : March 30, 2021
INVENTOR(S) : Joris Mertens et al.

Page 1 of 1

It is certified that error appears in the above-identified patent and that said Letters Patent is hereby corrected as shown below:

On the Title Page

Item [57] (Abstract), Line 31 (approx.):
Delete "The invention relates to a vehicle having a" and insert -- A --, therefor.

In the Claims

Column 12, Line 59:
In Claim 10, delete "occupant changes position." and insert -- occupant. --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*